United States Patent [19]

Ehman

[11] 3,914,525

[45] Oct. 21, 1975

[54] MERCURY SULFIDE FILMS AND METHOD OF GROWTH

[75] Inventor: Michael F. Ehman, Mission Viejo, Calif.

[73] Assignee: Rockwell International Corporation, El Segundo, Calif.

[22] Filed: Mar. 15, 1974

[21] Appl. No.: 451,653

[52] U.S. Cl. ................ 428/539; 156/617; 148/171; 252/62.3 ZT; 357/16; 423/561

[51] Int. Cl.² ...................... H01L 3/00; H01M 15/02

[58] Field of Search ............ 117/113, 201; 148/171, 148/172, 173; 23/301 SP; 252/62.3 ZT; 423/99, 561; 156/617; 357/16

[56] References Cited

UNITED STATES PATENTS

| | | | |
|---|---|---|---|
| 3,496,024 | 2/1970 | Ruehrwein | 148/33.5 X |
| 3,558,373 | 1/1971 | Moody et al. | 148/171 |
| 3,585,087 | 6/1971 | Blum et al. | 148/171 |
| 3,649,351 | 3/1972 | Grabmaier | 148/171 X |
| 3,650,822 | 3/1972 | Grabmaier | 148/171 X |
| 3,664,866 | 5/1972 | Manasevit | 117/201 |
| 3,692,572 | 9/1972 | Strehlow | 117/201 |
| 3,791,887 | 2/1974 | Deitch | 148/171 X |

*Primary Examiner*—Michael R. Lusignan
*Attorney, Agent, or Firm*—G. Donald Weber, Jr.; H. Fredrick Hamann; Robert Ochis

[57] ABSTRACT

Monocrystalline films or layers of hexagonal mercury sulfide or cinnabar are epitaxially grown on monocrystalline optical or semiconductive substrates using liquid phase epitaxy. The films are grown by forming a charge consisting of HgS, $Na_2S$, and S; heating the charge to above the 344°C transition temperature of HgS to form a homogeneous melt consisting of HgS solute in $Na_2S_4$ solvent; lowering the temperature of the melt to saturate the solvent with HgS; inserting a monocrystalline substrate seed crystal into the melt; and, slowly cooling the melt to supersaturate the melt with respect to HgS, then precipitate HgS out of solution and form a monocrystalline layer of cinnabar on the substrate seed crystal.

5 Claims, 2 Drawing Figures

MERCURY SULFIDE FILMS AND METHOD OF GROWTH

BACKGROUND OF THE INVENTION

1. Field of the Invention

This invention relates to monocrystalline films utilized in optic and piezoelectric devices and, more particularly, to hexagonal HgS, cinnabar, and to the growth monocrystalline cinnabar films on optical or semiconductive substrates using liquid phase epitaxy.

2. Description of the Prior Art

The properties of cinnabar indicate it is well suited for use in thin film or bulk crystal form, e.g., as a laser window, in integrated optic devices or surface accoustic wave devices, and so forth.

The properties of cinnabar make it of interest in thin film form to the near infrared and far infrared integrated optics. For example, its large birefringence permits the creation of degenerate waveguides, that is, waveguides wherein the propagation velocities of TE and TM modes may be equated. Cinnabar also exhibits the largest acousto-optic figure of merit of any material that is transparent within the wavelength range of approximately 1–10 microns. Consequently, cinnabar is potentially applicable to thin film scanners, switches, beam deflectors, and spatial modulators. Furthermore, the comparatively large electro-optic coupling coefficient of cinnabar should reduce the modulator drive power required for integrated optical devices.

The electro-optic coefficient of cinnabar is apparently unreported, but an estimate based upon the nonlinear susceptibility and the refractive index suggests that the coefficient may be high, comparable to CdTe, and that cinnabar has excellent potential for use in nonlinear optical devices.

Unfortunately, standard thin film growth techniques which are used for other II–VI compounds cannot be applied to cinnabar. These techniques, e.g., chemical and physical vapor deposition, require high temperatures. There are at least two major factors which preclude growing cinnabar thin films (or crystals) at such high temperatures. The first is that cinnabar is moderately unstable and breaks down to its constituent elements at high temperature, presenting reactions which are competitive with the growth reactions which are frequently used in techniques such as chemical vapor transport. Secondly, at the relatively low temperature of 344° there is a phase transition from the desirable, optically active, hexagonal form, cinnabar, to the optically inactive, cubic sphalerite form, metacinnabar.

Typically, in chemical vapor transport utilizing flowing gas systems, the elements (or compounds) which are to be deposited are transported in a vapor state complexed with other elements. The complexes then break down into the desired elements upon contacting a hot substrate. Unfortunately, the high deposition temperatures which are required, >500°C, eliminate the use of most chemical vapor transport techniques for the growth of HgS. Also, the high temperatures required for efficiency in other types of chemical vapor transport eliminate their use. Finally, physical vapor transport cannot be utilized because the HgS vapor pressures required for deposition cannot be achieved below about 500°C.

Some mild success has been achieved in growing bulk single crystals of cinnabar. For example, it is reported by S. T. Scott and H. L. Barnes in Materials Research Bulletin, Volume 4, p. 879 (1969), that 2 mm cinnabar crystals have been grown using mercury bisulfide complexes as the transport species in a weakly alkaline hydrothermal solution. Also, as reported by R. W. Garner and W. B. White in the Journal of Crystal Growth, Volume 7, p. 343 (1970), bulk HgS crystals have been grown at a temperature of 230°–300°C using alkaline polysulfide fluxes selected from the system $Na_2S$—S.

However, there are at least two major reasons why these bulk growth techniques are not suitable for the growth of epitaxial thin films on substrates. First, most of the substrates of interest, such as the alkali halides, II–VI compounds, etc., are extremely soluble in the alkaline hydro-thermal solutions. Second, both techniques rely on large thermal gradients to induce rapid crystal growth at many sites in the crystal growth chamber (self-nucleation). The self-nucleates then become the sites for bulk growth. These conditions are unsuitable for epitaxial film growth, where only substrate nucleation sites are desired. In epitaxial film growth, nucleation and growth on the chamber would compete for nutrient with the epitaxial growth on the substrate.

Because of the problems associated with applying alkaline hydro-thermal solutions and large thermal gradients to epitaxial growth techniques, in addition to the aforementioned problems associated with epitaxial growth techniques (the lack of stability at high temperatures and the phase transition at 344°), epitaxial cinnabar thin films previously have not been successfully grown.

SUMMARY OF THE INVENTION

Monocrystalline hexagonal HgS is grown on an optical or semi-conductive substrate according to a method which comprises the steps of forming a molten charge or melt of HgS and $Na_2S_4$ above the 344°C HgS transition temperature; lowering the temperature of the melt to saturate the melt with respect to HgS; inserting the monocrystalline substrate into the melt; and slowly cooling the furnace to supersaturate and precipitate the HgS.

The materials used to form the molten charge are typically $Na_2S$ and S in the ratios of approximately 65 to 80 weight percent $Na_2S$ to about 35 to 20 weight percent S, and also HgS in the amount of about 20 to 40 weight percent of the total of the other constituents. The molten charge consists of HgS solute and $Na_2S_4$ solvent or flux in the approximate mole ranges of 0.15–0.20 and 0.85–0.80, respectively. The actual weight percent of HgS required varies with the $Na_2S$/S ratio. The amount of HgS must be such that the flux becomes supersaturated with respect to HgS above the freezing point of the flux to allow film growth, but at or below the 344°C transition temperature of HgS to grow cinnabar alone, without metacinnabar.

DETAILED DESCRIPTION

The high temperature instability, the 344°C phase transition of HgS, and other problems are overcome and monocrystalline HgS films are grown on optical and semiconductive substrates by applying liquid phase epitaxy growth techniques to alkaline polysulfide couplexes. Success is attributable, in part, to the relatively low temperatures which may be used for liquid phase epitaxy and to the use of the alkaline polysulfide complexes.

Figure 1:
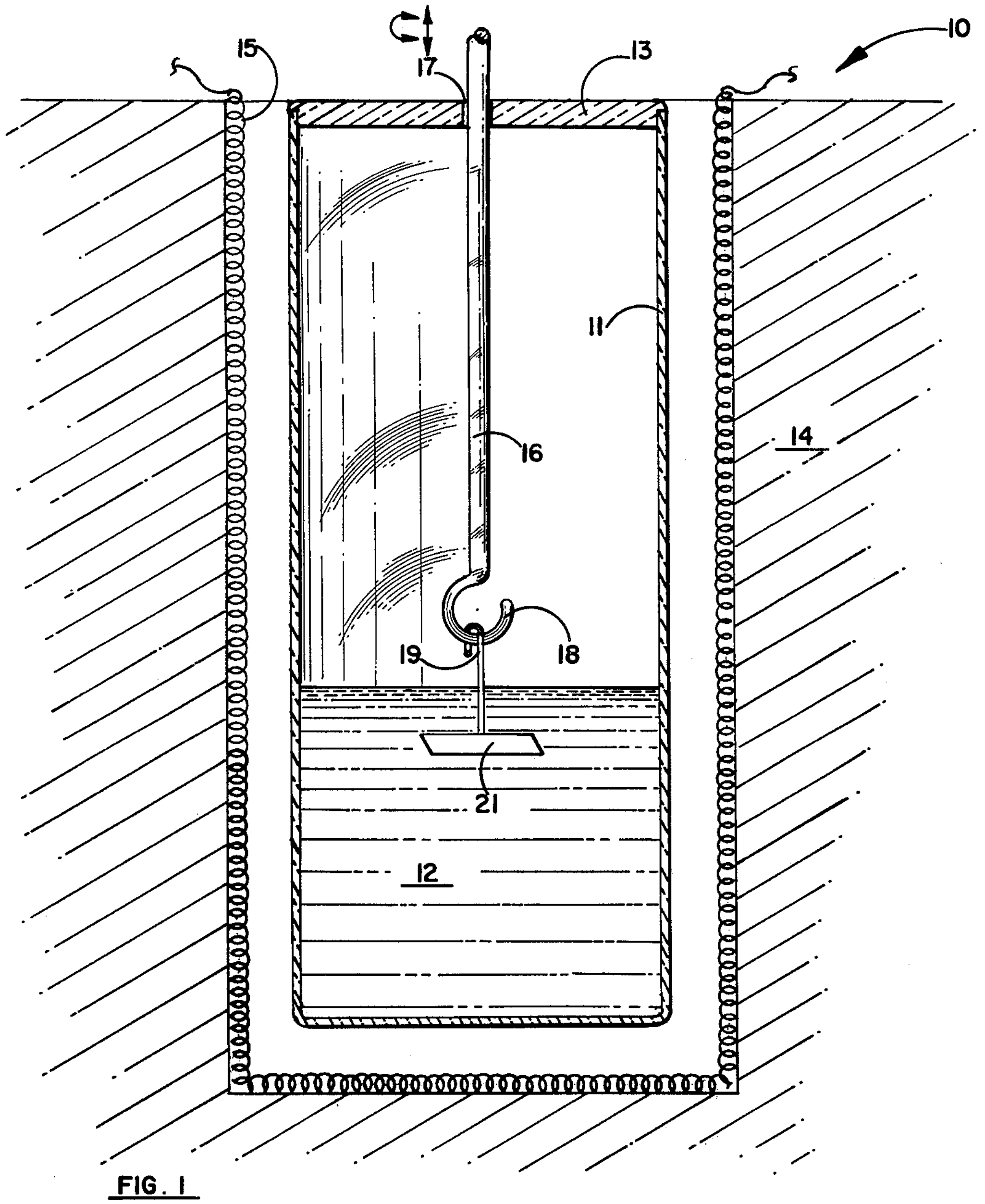
FIG. 1 is a cross-sectional representation of furnace apparatus which is suitable for growing thin film monocrystalline cinnabar crystals in accordance with the present invention.

Referring now to FIG. 1, there is shown furnace apparatus 10 which is suitable for growing monocrystalline cinnabar films using the method of the present invention. The furnace apparatus 10 includes a pyrex crucible 11 for a molten charge or melt 12 and a pyrex lid 13 for sealing the crucible. The crucible is surrounded by insulation 14, e.g., a ceramic insulation such as firebrick. The crucible 11 is heated by a resistance heating coil 15 which is actuated by a conventional power supply (not shown). The resistance furnace apparatus 10 also utilizes a crystal puller 16 which extends through an aperture 17 in the pyrex lid 13. The crystal puller 16 has a hook 18 on the lower end thereof for attaching a wire (typically platinum) crystal holder 19.

Figure 2:
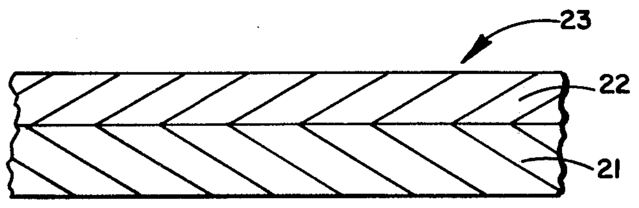
FIG. 2 is a cross-sectional representation of a composite grown in accordance with the present invention and comprising an epitaxial monocrystalline cinnabar film on a monocrystalline optical or a semi-conductive substrate.

The crystal puller 16 is controlled by conventional means (not shown) for both translational and rotational movement within the crucible 11. Typically, the crystal puller 16 and the wire holder 19 are used to immerse a substrate 21 in the melt 12 for the growth thereon of a monocrystalline thin film 22 (FIG. 2). FIG. 1 illustrates only one possible configuration of the furnace apparatus 10. Obviously other arrangements could be used with equal benefit.

The method of growing monocrystalline cinnabar films on insulating monocrystalline substrates utilizes liquid phase eqitaxy and comprises the steps of forming a charge consisting of the materials sulfur, HgS, and $Na_2S$ in weight percentages which are suitable for forming a melt of $Na_2S_4$ flux and of HgS of sufficient concentration such that the flux is supersaturated with HgS at or below the 344°C HgS transition temperature; heating and equilibrating the charge in the crucible above the 344°C transition temperature of HgS, typically approximately 350°C, to form a homogeneous molten charge; lowering the temperature of the melt sufficiently, usually to below the 344°C phase transition temperature, to saturate the flux with HgS; inserting into the melt a monocrystalline substrate which is stable therein; and slowly cooling the melt to supersaturate with respect to the HgS and deposit a layer of monocrystalline cinnabar on the substrate.

It is important that the flux supersaturate with respect to HgS at or below the 344°C transition temperature to ensure growth of hexagonal cinnabar without cubic metacinnabar. Also, to provide a wide temperature range for growth, i.e., to provide the onset of growth as high as possible above the freezing point of the flux (e.g., the eutectic point) the supersaturation point should be close to the transition temperature.

Suitable charges contain $S/Na_2S$ weight ratios within the approximate range 65/35 to 80/20 and HgS solute of 20 to 40 weight percent of the charge. The charge may be conveniently formed by dry mixing sulfur, $Na_2S$, and HgS in a ball before heating in the crucible 11. The dry materials are selected based upon the gram molecular ratios of HgS and $Na_2S_4$ which are desired in the molten charge 12 and the cinnabar thin film 22.

Application of the above-described method is illustrated by the following example:

EXAMPLE

The desired charge contained 0.15 mole HgS solute and 0.85 mole $Na_2S_4$ flux per mole of charge. A higher mole concentration of HgS could have been used, since the solubility of HgS in tetrasulfide is 20 mole percent at 350°C. The materials used to produce this charge consisted of 2.9578 grams sulfur and 18.6524 grams $N_2S$ as the flux, and 9.7715 grams HgS solute.

The dry constituents were dry mixed in a ball mill for 3 hours, then placed in the pyrex crucible 11. Argon was admitted to the crucible 11 via inlet tubes (not shown) while the system was heated to 350°C to form a homogeneous melt 12 from the charge. Other inert gases, such as nitrogen, may be utilized. The melt was maintained at 350°C for about 2 hours to insure homogeneity and thermal equilibration, then the temperature was lowered below 344°C (which was the saturation point for a charge of the stated composition as well as the phase transition temperature) to about 340°C.

The monocrystalline substrate 21 was a CdS platelet having a major face of a 0001 orientation. CdS is stable, i.e., insoluble or only slightly soluble, in polysulfide fluxes. This substrate platelet 21 was lowered into the melt using the crystal puller 16. In order to facilitate mixing of the melt and reduce the diffusion boundary layer at the interface between the melt and substrate, the substrate was rotated in the melt at approximately 5 rpm throughout the run.

The furnace was then slowly cooled at the rate of approximately 0.5°C per hour to supersaturate the melt 12 with respect to HgS. For the particular melt composition, supersaturation occurred at 325°C, well above the eutectic point of about 280°C.

About 25°C below the saturate-supersaturation transition of 325°C, i.e., at about 300°C, the substrate 21 was elevated to a position just above melt 12 and the heating coil 15 was inactivated to cool the furnace apparatus 10 to room temperature for removal of the composite comprising the substrate 21 and the HgS film 22.

Characterization indicated the HgS had formed a reddish, mono-crystalline hexagonal film of 0001 orientation. The red color and hexagonal crystal structure establish that the film was of the desired cinnabar form of HgS, rather than the black, cubic metacinnabar form. In short, LPE techniques has been used to successfully form a composite 23 comprising a monocrystalline film 22 of the II-VI compound cinnabar on a monocrystalline substrate 21 of the II-VI compound CdS. The composite 23 is illustrated schematically in FIG. 2.

The invention is not limited to the growth of HgS-CdS composites. For example, films or layers of II-VI compounds other than HgS, which are not subject to the problems caused by the transition temperature of HgS, may be grown according to the present invention. Also, the flux and low temperature of the liquid phase epitaxy technique permit the use of substrates which consist of compounds, such as other II-VI compounds, which would be unstable using other growth techniques.

Thus, there has been described a method of growing monocrystalline cinnabar films on monocrystalline substrates and a resulting composite. The invention is applicable, e.g., to the formation of optic, acousto-optic and piezoelectric devices. Exemplary compositions, temperatures, times and other parameters have been given. However, the invention is limited only by the claims appended hereto and equivalents thereof.

Having thus described the preferred embodiment of the invention, what is claimed is:

1. A method of forming a layer of monocrystalline hexagonal mercury sulfide on a monocrystalline substrate, comprising:

forming a melt above the HgS transition temperature of 344°C, said melt consisting of about 0.15–0.20 mole of HgS and 0.85–0.80 mole of $Na_2S_4$;

lowering the temperature of said melt to saturate said melt with respect to HgS;

inserting a monocrystalline substrate into said melt, said substrate being stable in said melt and having a deposition surface; and cooling said melt further to supersaturate with respect to the HgS to precipitate HgS out of the melt and form a monocrystalline layer of hexagonal HgS on the deposition surface of said substrate.

2. The method set forth in claim 1, wherein said monocrystalline substrate is of CdS and said deposition surface is of 0001 orientation.

3. The method set forth in claim 1, wherein said melt consists of 0.15 mole HgS and 0.85 mole $Na_2S_4$, wherein the temperature of said forming step is about 350°C, the temperature of said lowering step is about 340°C, the cooling rate of said cooling step is about 0.5°C/hr and is terminated at about 300°C, and wherein said substrate is rotated about 5 rpm during at least said cooling step.

4. A composite prepared by the method recited in claim 1 comprising:

a substrate of a monocrystalline II-VI compound; and an epitaxial layer of monocrystalline hexagonal crystal structure HgS formed on said substrate.

5. A composite as defined in claim 4 wherein said substrate is of CdS.

* * * * *